(12) United States Patent
Aoki et al.

(10) Patent No.: US 9,555,802 B2
(45) Date of Patent: Jan. 31, 2017

(54) DRIVING SUPPORT DEVICE

(71) Applicant: HONDA MOTOR CO., LTD., Tokyo (JP)

(72) Inventors: Tomoyoshi Aoki, Wako (JP); Sachio Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/074,160

(22) Filed: Mar. 18, 2016

(65) Prior Publication Data

US 2016/0280223 A1 Sep. 29, 2016

(30) Foreign Application Priority Data

Mar. 25, 2015 (JP) .................................. 2015-062139
Dec. 14, 2015 (JP) .................................. 2015-242849

(51) Int. Cl.
*A01B 69/00* (2006.01)
*B60W 30/12* (2006.01)
*G06K 9/00* (2006.01)

(52) U.S. Cl.
CPC .......... *B60W 30/12* (2013.01); *G06K 9/00798* (2013.01); *G06K 9/00805* (2013.01)

(58) Field of Classification Search
CPC ........... B60W 30/12; G06K 9/00; B62D 13/00
USPC .. 701/41, 23–26, 28, 96, 301; 340/902–903, 340/905, 435–436
See application file for complete search history.

(56) References Cited

U.S. PATENT DOCUMENTS

| | | | |
|---|---|---|---|
| 6,169,940 B1* | 1/2001 | Jitsukata | B62D 1/28 340/903 |
| 2004/0098196 A1* | 5/2004 | Sekiguchi | B60K 31/0008 701/301 |
| 2006/0233425 A1* | 10/2006 | Kobayashi | G06K 9/00798 382/106 |
| 2007/0152804 A1* | 7/2007 | Breed | B60N 2/2863 340/435 |
| 2008/0161986 A1* | 7/2008 | Breed | G08G 1/161 701/23 |

(Continued)

FOREIGN PATENT DOCUMENTS

| JP | 2000-168395 | 6/2000 |
|---|---|---|
| JP | 2005-332192 | 12/2005 |

*Primary Examiner* — Thomas G Black
*Assistant Examiner* — Luke Huynh
(74) *Attorney, Agent, or Firm* — Westerman, Hattori, Daniels & Adrian, LLP

(57) ABSTRACT

A driving support device includes: a preceding vehicle recognizer that recognizes a preceding vehicle; a lane mark recognizer that recognizes a lane mark; a path following controller that controls the own-vehicle; and a lane maintaining controller that controls the own-vehicle when a vehicle speed of the own-vehicle is greater than or equal to a predetermined speed. The driving support device further includes a prediction unit that predicts a shift of the own-vehicle to a running state with the predetermined speed or greater, and while the own-vehicle is under control of the path following controller, when the preceding vehicle ceases to be an object recognized by the preceding vehicle recognizer, the vehicle speed is less than the predetermined speed, and the prediction unit (control management unit) predicts the shift of the own-vehicle to the running state with the predetermined speed or greater, the lane maintaining controller controls the own-vehicle.

12 Claims, 5 Drawing Sheets

(56) References Cited

U.S. PATENT DOCUMENTS

| 2009/0125204 A1* | 5/2009 | Kudo | B62D 15/026 |
| | | | 701/96 |
| 2011/0169958 A1* | 7/2011 | Imai | B60W 30/12 |
| | | | 348/149 |
| 2014/0236414 A1* | 8/2014 | Droz | B60W 30/00 |
| | | | 701/28 |

* cited by examiner

DRIVING SUPPORT DEVICE

CROSS REFERENCES TO RELATED APPLICATIONS

The present application claims priority under 35 U.S.C. §119 to Japanese Patent Applications No. 2015-062139 and No. 2015-242849, filed Mar. 25, 2015 and Dec. 14, 2015, entitled "Driving Support Device." The contents of this application are incorporated herein by reference in their entirety.

TECHNICAL FIELD

This disclosure relates to a driving support device that performs driving support of a vehicle.

BACKGROUND

For instance, two types of driving support control are known. One is driving support control (hereinafter also referred to as lane maintaining control) to maintain an own-vehicle in a traffic lane along a lane mark, and is also called lane keeping control. The other is driving support control (hereinafter also referred to as path following control) to cause an own-vehicle to follow the path of a preceding vehicle.

For instance, Japanese Unexamined Patent Application Publication No. 2005-332192 (paragraphs [0043] to [0046]) discloses that lane maintaining control and path following control are performed. Specifically, it is disclosed that when a preceding vehicle is running away from the own-vehicle, a target running path of the own-vehicle is set based on a lane mark, and when a preceding vehicle is running close to the own-vehicle, a target running path of the own-vehicle is set based on the position of the preceding vehicle.

In the lane maintaining control, it is necessary to capture and recognize a lane mark presented ahead by an in-vehicle camera or the like. However, there are many locations (for instance, intersections) on general roads where a lane mark is discontinued, and cases frequently occur where there is no lane mark to be captured by a camera. Also, when the own-vehicle is running at a low speed due to traffic congestion or the like, the own-vehicle may approach a preceding vehicle and the lane mark ahead may be blocked by the preceding vehicle. Then, cases occur where a lane mark may not be captured by a camera or the like. For this reason, when the own-vehicle is running on a general road or running at a low speed, the lane maintaining control may not be performed in some cases. For instance, Japanese Unexamined Patent Application Publication No. 2000-168395 (paragraph [0038]) discloses that while the lane maintaining control is performed, when the vehicle speed of the own-vehicle becomes less than or equal to a predetermined vehicle speed, driving support control performed up to now is cancelled.

When a vehicle capable of performing lane maintaining control and path following control performs the path following control on a highway, a preceding vehicle may move to a branch traffic lane and disappears from the area ahead of the own-vehicle. According to Japanese Unexamined Patent Application Publication No. 2000-168395, in this situation, when the own-vehicle is running at a low speed due to traffic congestion or the like, the driving support control is automatically canceled. Then, a driver is unable to receive the driving support, and the operational burden of the driver increases.

SUMMARY

The present disclosure has been made in consideration of such a problem and provides, for example, a driving support device capable of properly performing driving support control according to a running state to reduce the operational burden of a driver.

The present disclosure provides, for example, a driving support device including: a preceding vehicle recognizer that recognizes a preceding vehicle; a lane mark recognizer that recognizes a lane mark of a traffic lane in which an own-vehicle runs; a path following controller that controls the own-vehicle so that the own-vehicle follows a path of the preceding vehicle recognized by the preceding vehicle recognizer; a lane maintaining controller that, when a vehicle speed of the own-vehicle is greater than or equal to a predetermined vehicle speed, controls the own-vehicle so that the own-vehicle maintains a traffic lane along the lane mark recognized by the lane mark recognizer; and a prediction unit that predicts a shift of the own-vehicle to a running state with the predetermined vehicle speed or greater. While the own-vehicle is under control of the path following controller, in the case where the preceding vehicle ceases to be an object recognized by the preceding vehicle recognizer, the vehicle speed is less than the predetermined vehicle speed, and the prediction unit predicts a shift of the own-vehicle to the running state with the predetermined vehicle speed or greater, the lane maintaining controller controls the own-vehicle.

Here, while the own-vehicle is under control of the path following controller, in the case where the preceding vehicle ceases to be an object recognized by the preceding vehicle recognizer, the vehicle speed is less than the predetermined vehicle speed, and the prediction unit predicts a shift of the own-vehicle to the running state with the predetermined vehicle speed or greater, the lane maintaining controller controls the own-vehicle. Accordingly, when the own-vehicle is running at a low speed on a highway while performing path following control, even in the case where the preceding vehicle moves to a branch lane and disappears from the area ahead of the own-vehicle, the driving support control of the own-vehicle continues to be performed. Therefore, the driver is able to continue to receive the driving support, thereby reducing the operational burden of a driver.

The driving support device may further include a preceding vehicle following controller that, when the own-vehicle is controlled by the path following controller, performs acceleration and deceleration control of the own-vehicle to maintain a distance between the own-vehicle and the preceding vehicle at the vehicle speed less than or equal to a maximum target vehicle speed, and the prediction unit may compare the maximum target vehicle speed with the predetermined vehicle speed, and when the maximum target vehicle speed is greater than or equal to the predetermined vehicle speed, the prediction unit may predict a shift of the own-vehicle to the running state with the predetermined vehicle speed or greater.

Accordingly, even when the preceding vehicle disappears from the area ahead of the own-vehicle, it is possible to predict a shift of the own-vehicle to a running state with the predetermined vehicle speed or greater, and thus the driving support control of the own-vehicle continues to be performed. Therefore, the driver is able to continue to receive the driving support, thereby reducing the operational burden of a driver.

The prediction unit may continue to compare the maximum target vehicle speed with the predetermined vehicle speed until a predetermined allowable time elapses after the preceding vehicle ceases to be an object recognized by the preceding vehicle recognizer.

Accordingly, it is possible to predict a shift of the own-vehicle to a running state with the predetermined vehicle speed or greater, based on a change of the maximum target vehicle speed during the allowable time, and thus the driving support control of the own-vehicle continues to be performed. Therefore, the driver is able to continue to receive the driving support, thereby reducing the operational burden of a driver.

The lane maintaining controller may control the own-vehicle until the predetermined allowable time elapses.

Accordingly, it is possible to temporarily perform the lane maintaining control during the allowable time during which the prediction unit compares the maximum target vehicle speed with the predetermined vehicle speed, thereby reducing the operational burden of a driver.

Moreover, when the own-vehicle is located on a highway, the prediction unit may predict a shift of the own-vehicle to a running state with the predetermined vehicle speed or greater.

Accordingly, even when the preceding vehicle disappears from the area ahead of the own-vehicle, it is possible to predict a shift of the own-vehicle to a running state with the predetermined vehicle speed or greater, and thus the driving support control of the own-vehicle continues to be performed. Therefore, the driver is able to continue to receive the driving support, thereby reducing the operational burden of a driver.

According to the present disclosure, for example, when the own-vehicle is running at a low speed on a highway while performing path following control, even in the case where the preceding vehicle moves to a branch lane and disappears from the area ahead of the own-vehicle, the driving support control of the own-vehicle continues to be performed. Therefore, the driver is able to continue to receive the driving support, thereby reducing the operational burden of a driver.

BRIEF DESCRIPTION OF THE DRAWINGS

The advantages of the disclosure will become apparent in the following description taken in conjunction with the following drawings.

DETAILED DESCRIPTION

Figure 1:
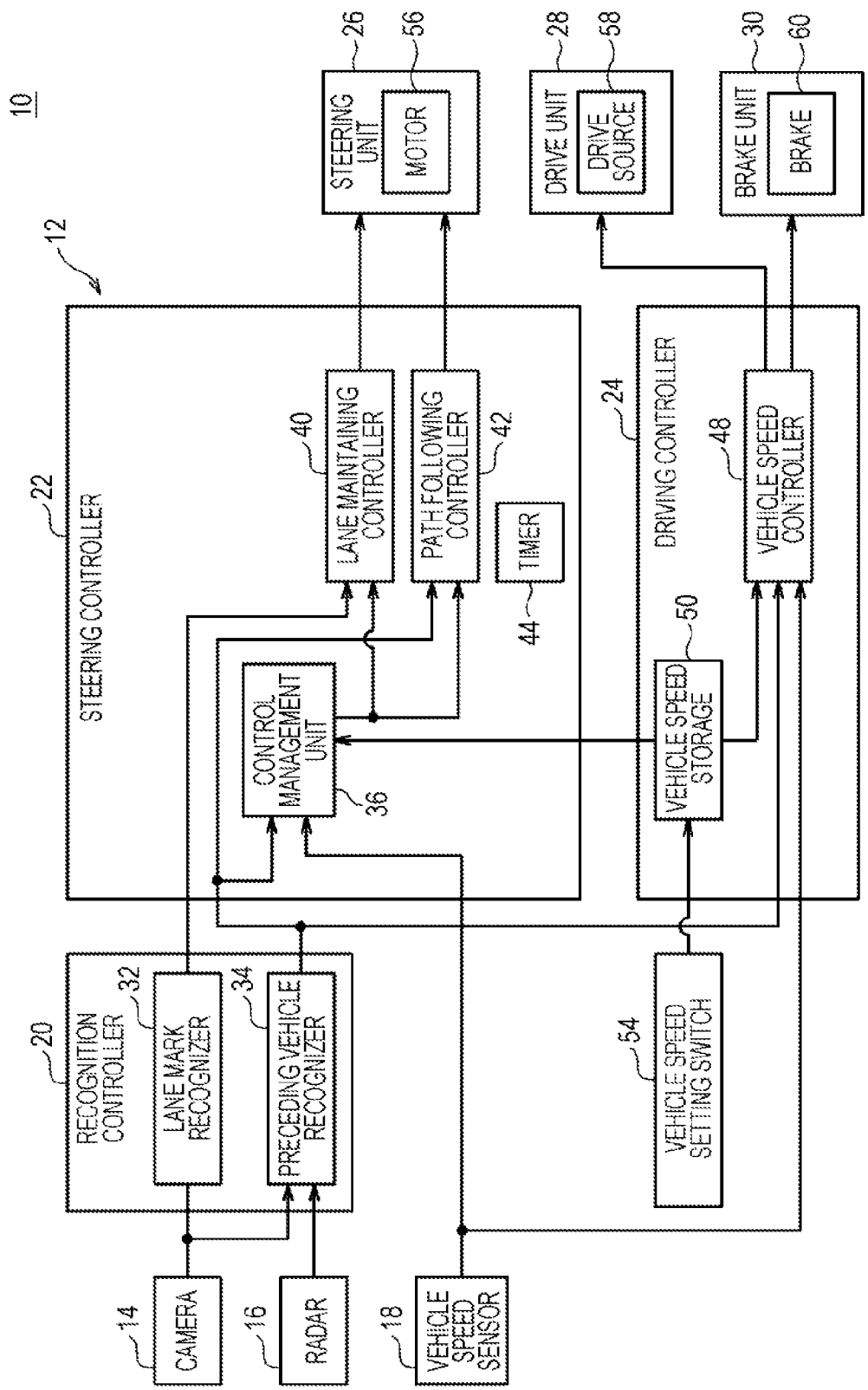
FIG. 1 is a functional block diagram of a driving support device according to a first embodiment.

Hereinafter, preferred embodiments of a driving support device according to the present disclosure will be given and described with reference to the accompanying drawings.

First Embodiment

Configuration of Driving Support Device 12

The configuration of a driving support device 12 will be described with reference to FIG. 1. The driving support device 12 includes a recognition controller 20 that recognizes an object and environment ahead of an own-vehicle 10 based on information obtained by a camera 14 and a radar 16, a steering controller 22 that performs processing related to steering of the own-vehicle 10, a driving controller 24 that performs processing related to driving of the own-vehicle 10, a steering unit 26 operative in response to a steering command outputted from the steering controller 22, a drive unit 28 operative in response to an acceleration command outputted from the driving controller 24, and a brake unit 30 operative in response to a deceleration command outputted from the driving controller 24.

The camera 14 captures a lane mark and an object, for instance, a preceding vehicle 92 (see FIG. 3, the same applies hereafter) ahead of the own-vehicle 10 and obtains image information. As the camera 14, a monocular camera or a stereo camera may be used. The radar 16 detects an object such as the preceding vehicle 92 ahead of the own-vehicle 10 using electromagnetic waves and/or ultrasonic waves. As the radar 16, a millimeter-wave radar, a microwave radar, a laser radar, an infrared sensor, an ultrasonic sensor, and others may be used. A vehicle speed sensor 18 detects a vehicle speed V of the own-vehicle 10.

The recognition controller 20 includes an ECU. The ECU is a computer including a microcomputer, and includes a central processing unit (CPU), a ROM (EEPROM is also included) which is a memory, a random access memory (RAM), an input/output device such as an A/D converter, a D/A converter, and a timer as a time measurement unit. The ECU functions as various function realization units such as various controllers, a calculation unit, and a processing unit by reading and executing programs recorded on the ROM. The ECU included in the recognition controller 20 in the present embodiment functions as a lane mark recognizer 32 and a preceding vehicle recognizer 34. It is to be noted that the ECU may be divided into a plurality of pieces, or integrated with other ECU.

The lane mark recognizer 32 is configured to recognize information on the object and environment ahead of the own-vehicle 10 based on image information obtained by the camera 14. A lane mark on a road surface is recognized by the lane mark recognizer 32. For recognition processing, a well-known algorithm may be used. The preceding vehicle recognizer 34 is configured to recognize the preceding vehicle 92 based on image information from the camera 14 and detected information from the radar 16. Based on reflected waves of the millimeter-wave radar for instance, the preceding vehicle recognizer 34 is configured to recognize, the position of the preceding vehicle 92 located ahead of the own-vehicle 10, the distance from the own-vehicle 10 to the preceding vehicle 92 (hereinafter referred to as the inter-vehicle distance), and a relative velocity of the preceding vehicle 92 with respect to the own-vehicle 10.

The steering controller 22 includes an ECU. The ECU included in the steering controller 22 in the present embodiment functions as a control management unit (prediction unit) 36, a lane maintaining controller 40, and a path following controller 42. In addition, the steering controller 22 includes a timer 44. The control management unit 36 is configured to determine whether lane maintaining control or path following control is performed, or neither of those driving support control is performed, based on information obtained from the vehicle speed sensor 18 and the preceding vehicle recognizer 34. Furthermore, the control management unit 36 is configured to, when the determination is made, predict by a predetermined prediction method whether the own-vehicle 10 undergoes a shift to a high-speed running state. The lane maintaining controller 40 is configured to perform various calculations for maintaining the own-vehicle 10 in a traffic lane along a lane mark. The path following controller 42 is configured to perform various calculations for causing the own-vehicle 10 to follow the path of the preceding vehicle 92.

The driving controller 24 includes an ECU. The ECU included in the driving controller 24 in the present embodiment functions as a vehicle speed controller 48. The vehicle speed controller 48 is configured to, when the preceding vehicle 92 is recognized, adjust the vehicle speed V of the own-vehicle 10 in coordination with the preceding vehicle 92 and to perform various calculations for maintaining an inter-vehicle distance according to the vehicle speed V. The driving controller 24 further includes a vehicle speed storage 50. The vehicle speed storage 50 stores a maximum target vehicle speed Vmax which serves as an upper limit of the vehicle speed V when path following control is performed. The maximum target vehicle speed Vmax is changeable by an operation of a vehicle speed setting switch 54 which is operable by a driver.

Each of the steering unit 26, the drive unit 28, and the brake unit 30 includes an ECU. The steering unit 26 operates the motor 56 according to a steering command transmitted from the steering controller 22. The motor 56 rotates a steering shaft (not illustrated) in one way or the other. The drive unit 28 operates a drive source 58 according to an acceleration command transmitted from the driving controller 24. When the own-vehicle 10 is an engine vehicle, a throttle valve or the like is operated according to an acceleration command to drive the drive source (engine) 58. When the own-vehicle 10 is an electric vehicle including an electric motor, the drive source (electric motor) 58 is operated according to an acceleration command. The brake unit 30 operates a brake actuator according to a deceleration command transmitted from the driving controller 24, and causes the brake 60 to be applied.

<Driving Support Processing of Driving Support Device 12>

Figure 2:
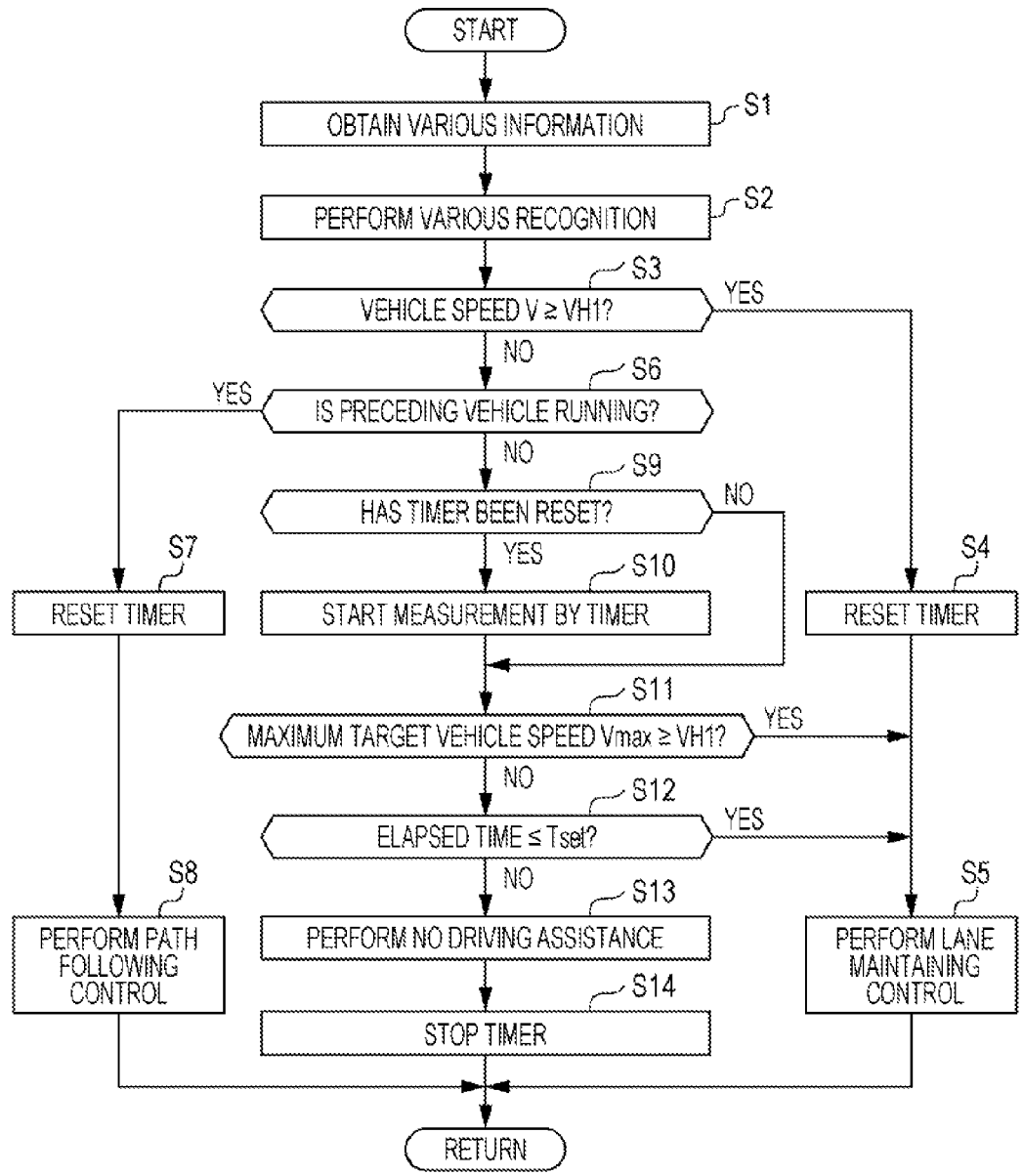
FIG. 2 is a flow chart of driving support processing performed in the first embodiment.

The driving support processing performed by the driving support device 12 will be described with reference to FIG. 2 and FIG. 3. The processing illustrated in FIG. 2 is continuously performed for every extremely short interval, for instance, of the order of ms (milliseconds). Also, the control management unit 36 resets the timer 44 before a series of processing in the following. In step S1, the camera 14, the radar 16, and the vehicle speed sensor 18 detect various information.

In step S2, the recognition controller 20 performs various recognition. The lane mark recognizer 32 performs predetermined recognition processing based on image information obtained by the camera 14 and recognizes a lane mark along which the own-vehicle 10 runs. The preceding vehicle recognizer 34 performs predetermined recognition processing based on detected information from the radar 16, and recognizes the presence or absence of the preceding vehicle 92 located ahead of the own-vehicle 10. When the preceding vehicle 92 is recognized, the preceding vehicle recognizer 34 recognizes the position of the preceding vehicle 92, the inter-vehicle distance, and a relative velocity of the preceding vehicle 92 with respect to the own-vehicle 10.

In step S3, the control management unit 36 determines whether the vehicle speed V of the own-vehicle 10 detected by the vehicle speed sensor 18 is greater than or equal to a predetermined vehicle speed VH1. In the present embodiment, when the own-vehicle 10 is running at a high speed or is predicted to shift to a high-speed running state, lane maintaining control is performed. The predetermined vehicle speed VH1 is used as a determination factor for determining whether the own-vehicle 10 is running at a high speed or shifts to a high-speed running state. The predetermined vehicle speed VH1 is set to, for instance, the legal minimum speed of the highway (50 km/s in Japan). When the vehicle speed V detected by the vehicle speed sensor 18 is greater than or equal to the predetermined vehicle speed VH1 (YES in step S3), the control management unit 36 determines that the own-vehicle 10 is running at a high speed on a highway, and determines that the lane maintaining control is to be performed by the lane maintaining controller 40. The flow then proceeds to step S4. On the other hand, when the vehicle speed V detected by the vehicle speed sensor 18 is less than the predetermined vehicle speed VH1 (NO in step S3), the control management unit 36 determines that the own-vehicle 10 is not running at a high speed. The flow then proceeds to step S6.

In step S4, the control management unit 36 resets the timer 44. Subsequently, in step S5, the lane maintaining controller 40 performs lane maintaining control. The lane maintaining controller 40 performs predetermined calculation processing based on information on the lane mark recognized by the lane mark recognizer 32 so that the own-vehicle 10 is able to maintain its traffic lane along the lane mark. For instance, in order to maintain the reference position of the own-vehicle 10 at a constant distance from the edge of the lane mark, various calculation processing is performed. A command value for steering is calculated by the calculation processing and is transmitted to the steering unit 26 as a steering command. The steering unit 26 rotates the motor 56 according to a steering command. In this manner, the own-vehicle 10 maintain its traffic lane along the lane mark.

In the case where the preceding vehicle 92 is not recognized by the preceding vehicle recognizer 34 when the lane maintaining control is performed, the following processing is performed. The vehicle speed controller 48 compares a maximum target vehicle speed Vmax stored in the vehicle speed storage 50 with a vehicle speed V detected by the vehicle speed sensor 18, and performs various calculation processing so that the vehicle speed V approaches the maximum target vehicle speed Vmax. The vehicle speed controller 48 then calculates a command value for acceleration or deceleration by calculation processing, and transmits the command value to the drive unit 28 or the brake unit 30 as an acceleration command or a deceleration command. The drive unit 28 operates the drive source 58 according to the acceleration command, and the brake unit 30 operates the brake 60 according to the deceleration command. In this manner, the own-vehicle 10 maintains the maximum target vehicle speed Vmax.

In the case where the preceding vehicle 92 is recognized by the preceding vehicle recognizer 34 when the lane maintaining control is performed, the following processing is performed. The vehicle speed controller 48 performs various calculation processing so as to maintain the inter-vehicle distance according to the vehicle speed V, based on the distance from the own-vehicle 10 to the preceding vehicle 92 recognized by the preceding vehicle recognizer 34, and a vehicle speed V detected by the vehicle speed sensor 18. The vehicle speed controller 48 then calculates a command value for acceleration or deceleration by calculation processing, and transmits the command value to the drive unit 28 or the brake unit 30 as an acceleration command or a deceleration command. The drive unit 28 operates the drive source 58 according to the acceleration command, and the brake unit 30 operates the brake 60 according to the deceleration command. In this manner, the own-vehicle 10 maintains the inter-vehicle distance to the preceding vehicle 92 at a distance according to the vehicle speed V. However, when the vehicle speed of the preceding vehicle 92 or the vehicle speed V exceeds the maximum target vehicle speed Vmax, the vehicle speed controller 48 does not transmit an acceleration command. Therefore, the own-vehicle 10 does not run at a speed greater than the maximum target vehicle speed Vmax.

In step S6, the control management unit 36 determines whether or not a preceding vehicle 92 is running, based on a result of recognition by the preceding vehicle recognizer 34. For instance, when the running position of the preceding vehicle 92 is P1 on driving traffic lane L1 as illustrated in FIG. 3, the preceding vehicle recognizer 34 of the own-vehicle 10 recognizes the preceding vehicle 92. When the preceding vehicle 92 is recognized (YES in step S6), the control management unit 36 determines that the preceding vehicle 92 is running, and determines that path following control is to be performed by the path following controller 42. The flow then proceeds to step S7.

Figure 3:
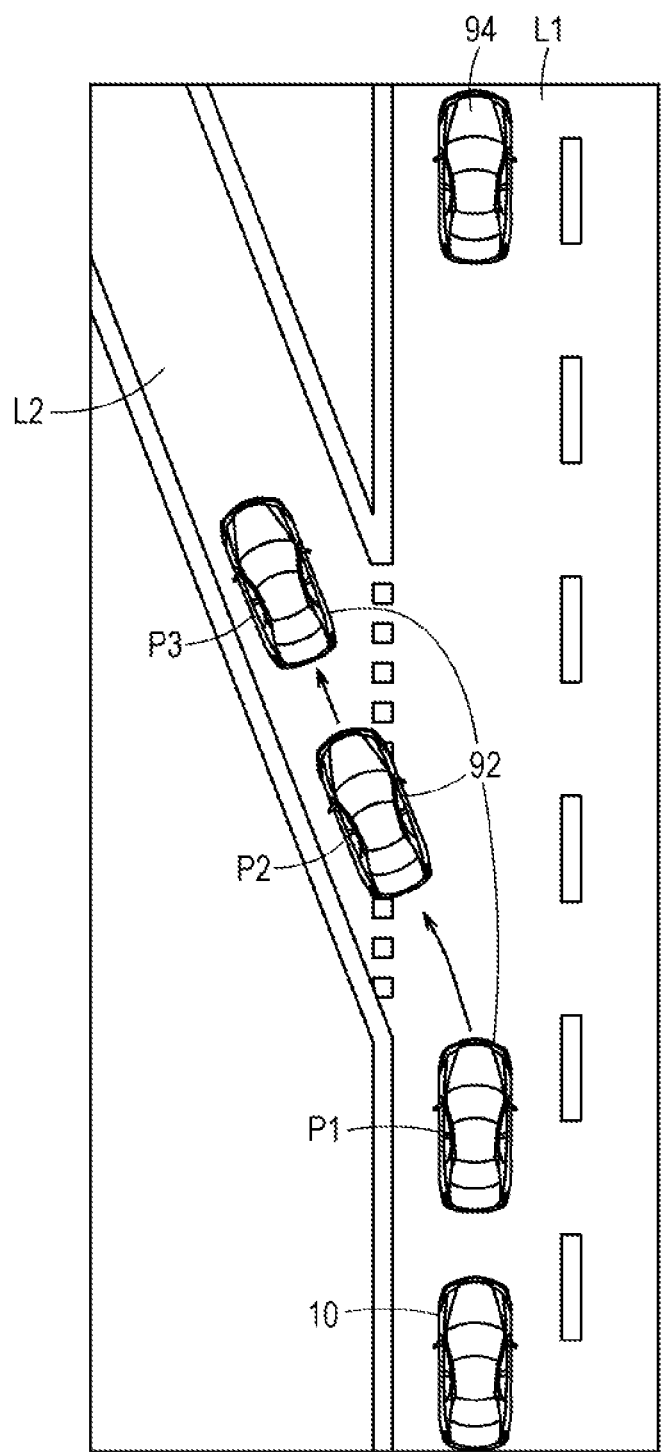
FIG. 3 is an explanatory diagram for explaining the first embodiment.

On the other hand, suppose that the preceding vehicle 92 moves from the driving traffic lane L1 to a branch traffic lane L2 as illustrated in FIG. 3. In the case where the running position of the preceding vehicle 92 is P2 or P3 on the branch traffic lane L2, and the inter-vehicle distance to a new preceding vehicle 94 is long, the preceding vehicle recognizer 34 of the own-vehicle 10 does not recognize the preceding vehicle 94. When the preceding vehicle recognizer 34 does not recognize the preceding vehicles 92, 94 (NO in step S6), the control management unit 36 determines that no preceding vehicles 92, 94 are running. The flow then proceeds to step S9.

In step S7, the control management unit 36 resets the timer 44. Subsequently, in step S8, the path following controller 42 performs path following control. The path following controller 42 performs predetermined calculation processing for causing the own-vehicle 10 to follow the path of the preceding vehicle 92 based on information on the preceding vehicle 92 recognized by the preceding vehicle recognizer 34. For instance, the path following controller 42 recognizes the preceding vehicle 92 based on image information obtained by the camera 14, and performs various calculation processing for causing the own-vehicle 10 to follow a path based on the side position of the preceding vehicle 92. A command value (for instance, a rotational speed of the motor 56) for steering is calculated by the calculation processing and is transmitted to the steering unit 26 as a steering command. The steering unit 26 rotates the motor 56 according to a steering command. In this manner, the own-vehicle 10 follows the path of the preceding vehicle 92.

When path following control is controlled, the vehicle speed controller 48 performs various calculation processing so as to maintain the inter-vehicle distance according to the vehicle speed V, based on the distance from the own-vehicle 10 to the preceding vehicle 92 recognized by the preceding vehicle recognizer 34, and a vehicle speed V detected by the vehicle speed sensor 18. The vehicle speed controller 48 then calculates a command value for acceleration or deceleration by calculation processing, and transmits the command value to the drive unit 28 or the brake unit 30 as an acceleration command or a deceleration command. The drive unit 28 operates the drive source 58 according to the acceleration command, and the brake unit 30 operates the brake 60 according to the deceleration command. In this manner, the own-vehicle 10 follows the preceding vehicle 92. However, when the vehicle speed of the preceding vehicle 92 or the vehicle speed V exceeds the maximum target vehicle speed Vmax, the vehicle speed controller 48 does not transmit an acceleration command. Therefore, the own-vehicle 10 does not run at a speed greater than the maximum target vehicle speed Vmax.

When the timer 44 is reset in step S9 (YES in step S9), in other words, when the timer 44 indicates zero, the control management unit 36 starts to measure time by the timer 44 in step S10. The flow then proceeds to step S11. On the other hand, when the timer 44 is not reset in step S9 in other words, when the timer 44 does not indicate zero, the control management unit 36 leaves the timer 44 as it is. The flow then proceeds to step S11.

In step S11, the control management unit 36 determines whether or not the maximum target vehicle speed Vmax, which serves as an upper vehicle speed limit in path following control, is greater than or equal to the predetermined vehicle speed VH1. When the maximum target vehicle speed Vmax stored in the vehicle speed storage 50 is greater than or equal to the predetermined vehicle speed VH1 (YES in step S11), the control management unit 36 predicts a shift of the own-vehicle 10 to a high-speed running state with the predetermined vehicle speed VH1 or greater. Setting of the maximum target vehicle speed Vmax to the predetermined vehicle speed VH1 or greater indicates a state in which it is possible to follow the preceding vehicle 92 by high speed running. In this case, the control management unit 36 determines that the lane maintaining control is to be performed by the lane maintaining controller 40. The flow then proceeds to step S5 which has been described already. On the other hand, when the maximum target vehicle speed Vmax stored in the vehicle speed storage 50 is less than the predetermined vehicle speed VH1 (NO in step S11), the control management unit 36 predicts no shift of the own-vehicle 10 to a high-speed running state with the predetermined vehicle speed VH1 or greater. The flow then proceeds to step S12.

In step S12, the control management unit 36 determines whether or not elapsed time since the preceding vehicle 92 ceases to be recognized is longer than or equal to a predetermined allowable time Tset (for instance, 5 s). When the time measured by the timer 44 is shorter than or equal to the allowable time Tset (YES in step S12), the flow proceeds to step S5 which has been described already. In this case, the lane maintaining controller 40 temporarily performs lane maintaining control. Therefore, even when the preceding vehicle 92 disappears from the area ahead of the own-vehicle 10, the lane maintaining control and the processing in and after step S1 are performed successively during the predetermined allowable time Tset. In some cases, a driver may reset the maximum target vehicle speed Vmax to the predetermined vehicle speed VH1 or greater using the vehicle speed setting switch 54 before the allowable time Tset elapses. In this case, the maximum target vehicle speed Vmax is determined to be greater than or equal to VH1 in step S11 (YES in step S11), the flow proceeds to step S5 which has been described already.

On the other hand, the time measured by the timer 44 exceeds the allowable time Tset with the maximum target vehicle speed Vmax less than the predetermined vehicle speed VH1 (NO in step S12), the flow proceeds to step S13. In step S13, the control management unit 36 determines that driving support control is not performed. In step S14, the control management unit 36 stops measuring time by the timer 44. In the case where the timer 44 is already stopped, the timer 44 is left in a stop state.

Summary of First Embodiment

The driving support device 12 according to the present embodiment includes: a preceding vehicle recognizer 34 that recognizes a preceding vehicle 92; a lane mark recognizer 32 that recognizes a lane mark of a traffic lane in which an own-vehicle 10 runs; a path following controller 42 that controls the own-vehicle 10 so that the own-vehicle 10 follows a path of the preceding vehicle 92 recognized by the preceding vehicle recognizer 34; a lane maintaining controller 40 that, when a vehicle speed V of the own-vehicle 10 is greater than or equal to a predetermined vehicle speed VH1, controls the own-vehicle 10 so that the own-vehicle 10 maintains a lane along the lane mark recognized by the lane mark recognizer 32; and a prediction unit (control management unit 36) that predicts a shift of the own-vehicle 10 to a running state with the predetermined vehicle speed VH1 or greater. While the own-vehicle 10 is under control of the path following controller 42, in the case where the preceding vehicle 92 ceases to be an object recognized by the preceding vehicle recognizer 34, the vehicle speed V is less than the predetermined vehicle speed VH1, and the prediction unit (control management unit 36) predicts a shift of the own-vehicle 10 to a running state with the predetermined vehicle speed VH1 or greater, the lane maintaining controller 40 controls the own-vehicle 10.

With the driving support device 12 according to the present embodiment, when the own-vehicle 10 is running at a low speed on a highway while performing path following control, even in the case where the preceding vehicle 92 moves to the branch lane L2 and disappears from the area ahead of the own-vehicle 10, the driving support control of the own-vehicle 10 continues to be performed. Therefore, the driver is able to continue to receive the driving support, thereby reducing the operational burden of a driver.

In addition, the driving support device 12 according to the present embodiment includes a preceding vehicle following controller (driving controller 24) that, when the own-vehicle 10 is controlled by the path following controller 42, performs acceleration and deceleration control of the own-vehicle 10 to maintain a distance between the own-vehicle 10 and the preceding vehicle 92 at the vehicle speed V less than or equal to a maximum target vehicle speed Vmax. The prediction unit (control management unit 36) compares the maximum target vehicle speed Vmax with the predetermined vehicle speed VH1, and when the maximum target vehicle speed Vmax is greater than or equal to the predetermined vehicle speed VH1, the prediction unit predicts a shift of the own-vehicle 10 to the running state with the predetermined vehicle speed VH1 or greater.

With the driving support device 12 according to the present embodiment, even when the preceding vehicle 92 disappears from the area ahead of the own-vehicle 10, it is possible to predict a shift of the own-vehicle 10 to a running state with the predetermined vehicle speed VH1 or greater, and thus the driving support control of the own-vehicle 10 continues to be performed. Therefore, the driver is able to continue to receive the driving support, thereby reducing the operational burden of a driver.

In the driving support device 12 according to the present embodiment, the prediction unit (control management unit 36) continues to compare the maximum target vehicle speed Vmax with the predetermined vehicle speed VH1 until a predetermined allowable time Tset elapses after the preceding vehicle 92 ceases to be an object recognized by the preceding vehicle recognizer 34.

With the driving support device 12 according to the present embodiment, it is possible to predict a shift of the own-vehicle 10 to a running state with the predetermined vehicle speed VH1 or greater, based on a change of the maximum target vehicle speed Vmax during the allowable time Tset, and thus the driving support control of the own-vehicle 10 continues to be performed. Therefore, the driver is able to continue to receive the driving support, thereby reducing the operational burden of a driver.

In the driving support device 12 according to the present embodiment, the lane maintaining controller 40 controls the own-vehicle 10 until the predetermined allowable time Tset elapses.

With the driving support device 12 according to the present embodiment, it is possible to temporarily perform the lane maintaining control during the allowable time Tset during which the prediction unit (control management unit 36) compares the maximum target vehicle speed Vmax with the predetermined vehicle speed VH1, thereby reducing the operational burden of a driver.

It is to be noted that when the own-vehicle 10 catches up the preceding vehicle 94 as a consequence of the lane maintaining control performed during the allowable time Tset, the preceding vehicle recognizer 34 starts to recognize the preceding vehicle 94 in step S2. When the vehicle speed V of the own-vehicle 10 detected by the vehicle speed sensor 18 is less than the predetermined vehicle speed VH1 in step S3 (NO in step S), the flow proceeds to step S6. In step S6, since it is determined that the preceding vehicle 94 is running (YES in step S6), the flow proceeds to step S7 and step S8. In this stage, the control management unit 36 stops the lane maintaining control by the lane maintaining controller 40, and determines that the path following control is to be performed by the path following controller 42.

Second Embodiment

Configuration of Driving Support Device 12*a*

The configuration of a driving support device 12*a* will be described with reference to FIG. 4. Many of the components of the driving support device 12*a* are the same as the components of the driving support device 12 illustrated in FIG. 1. Thus, the same components are labeled with the same symbol, and description thereof is omitted.

The driving support device 12*a* differs from the driving support device 12 in the determination factor used by a control management unit 36*a*. The control management unit 36 illustrated in FIG. 1, when predicting a shift of the own-vehicle 10 to a running state with the predetermined vehicle speed VH1 or greater, uses the maximum target vehicle speed Vmax stored in the vehicle speed storage unit 50 as a determination factor for prediction. On the other hand, the control management unit 36*a* illustrated in FIG. 4, when predicting a shift of the own-vehicle 10*a* to a running state with the predetermined vehicle speed VH1 or greater, uses position information on the own-vehicle 10*a* as a determination factor for prediction, the position information being obtained by a position information acquisition device 64.

The position information acquisition device 64 obtains the running position of the own-vehicle 10*a*. Position information on the own-vehicle 10*a* may be obtained using, for instance, a navigation system or a communication information system such as VICS (registered trademark). Alternatively, the position information may be obtained by a roadside device.

<Operation of Driving Support Device 12a>

Figure 5:
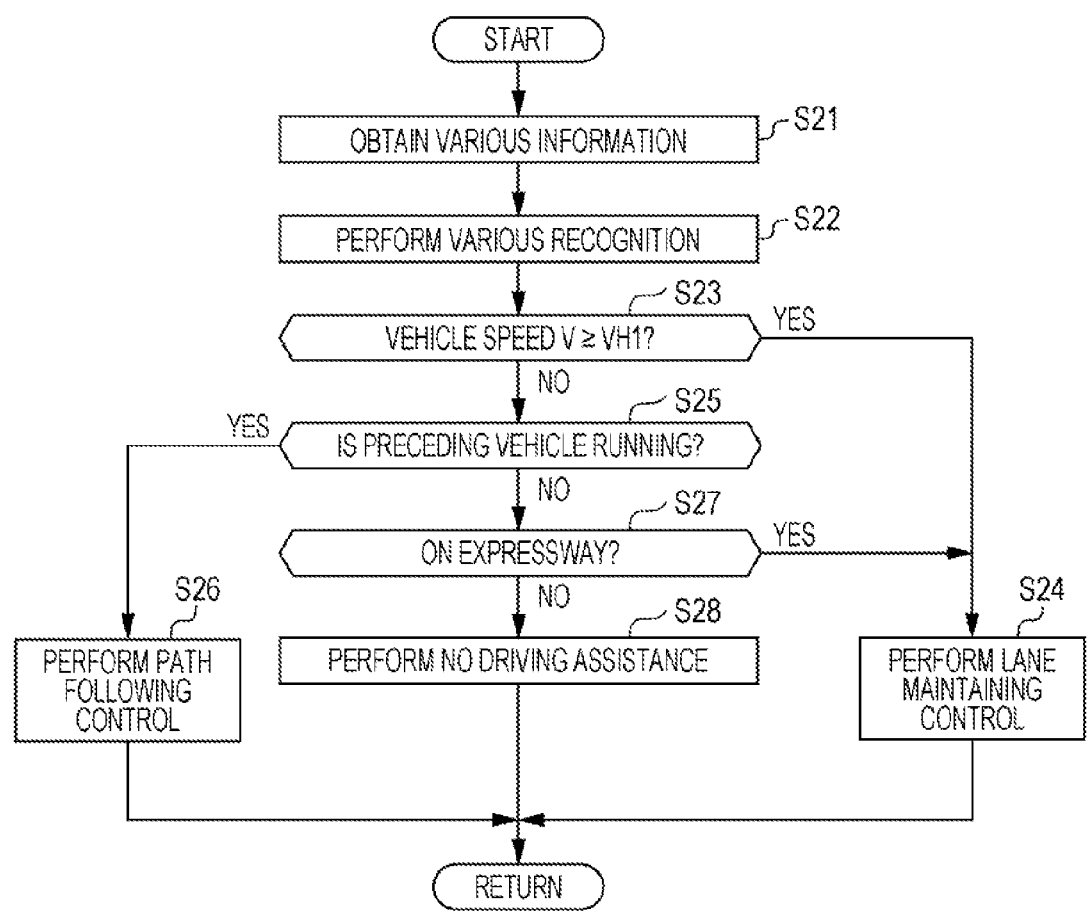
FIG. 5 is a flow chart of driving support processing performed in the second embodiment.

The operation of the driving support device 12a will be described with reference to FIG. 5. The processing of step S21 to step S26, and step S28 out of the processing illustrated in FIG. 5 is the same as the processing of step S1 to step S3, step S5, step S6, step S8, and step S13. Thus, description of those processing is omitted.

In step S27, the control management unit 36a determines whether or not the own-vehicle 10a is running on a highway. When the running position of the own-vehicle 10a obtained by the position information acquisition device 64 is on a highway (YES in step S27), the control management unit 36a predicts a shift of the own-vehicle 10a to a high-speed running state with the predetermined vehicle speed VH1 or greater. The running position on a highway indicates it is probable that the own-vehicle 10a is running on a highway at a low speed due to traffic congestion or the like. At this point, the control management unit 36a determines that the lane maintaining control is to be performed by the lane maintaining controller 40. The flow then proceeds to step S24 with the same processing as in step S5. On the other hand, when the running position is not on a highway (NO in step S27), the control management unit 36a predicts no shift of the own-vehicle 10a to a high-speed running state with the predetermined vehicle speed VH1 or greater. The flow then proceeds to step S28. In step S28, the control management unit 36a determines not to perform the driving support control.

Summary of Second Embodiment

In the driving support device 12a according to the present embodiment, when the own-vehicle 10a is located on a highway, the prediction unit (control management unit 36a) predicts a shift of the own-vehicle 10a to a running state with the predetermined vehicle speed VH1 or greater.

With the driving support device 12a according to the present embodiment, the effect equivalent to that of the first embodiment is obtained.

OTHER EMBODIMENTS

It is to be noted that naturally the present disclosure is not limited to the above-described embodiments and various configurations may be adopted in a range without departing from the gist of the present disclosure. For instance, the first embodiment and the second embodiment may be combined to perform both the processing of step S11, step S12 illustrated in FIG. 2, and the processing of step S27 illustrated in FIG. 5.

Although the predetermined vehicle speed VH1 is used as a determination factor in the processing of step S11 illustrated in FIG. 2 in the first embodiment, another predetermined vehicle speed VH2 (>VH1) may be used as a determination factor.

In the first and second embodiments, the predetermined vehicle speed VH1 is set to the legal minimum speed of the highway (50 km/s in Japan). However, it is also possible to set VH1 to another speed.

In the first embodiment, it is also possible to omit the processing of step S12 illustrated in FIG. 2.

Figure 4:
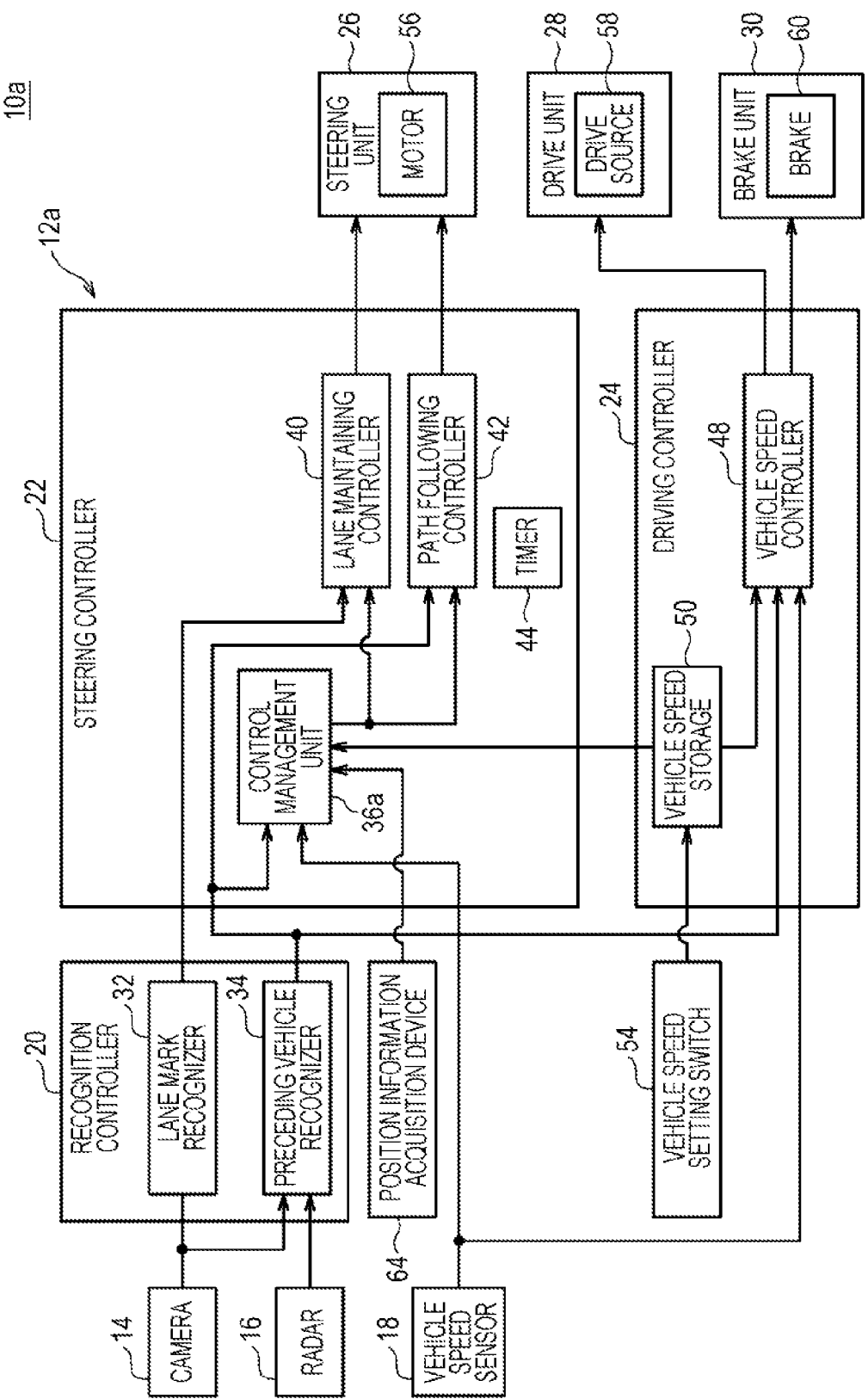
FIG. 4 is a functional block diagram of a driving support device according to a second embodiment.

The path following controller 42 illustrated in FIG. 1 and FIG. 4 may obtain position information on the preceding vehicle 92 from the outside via wireless communication to perform path following control. For instance, it is also possible to directly obtain position information (such as GPS information) from the preceding vehicle 92, the position information being obtained by the preceding vehicle 92. Alternatively, position information may be obtained indirectly via transportation infrastructure or the like. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A driving support device comprising:
   a preceding vehicle recognizer that recognizes a preceding vehicle;
   a lane mark recognizer that recognizes a lane mark of a traffic lane in which an own-vehicle runs;
   a path following controller that controls the own-vehicle so that the own-vehicle follows a path of the preceding vehicle recognized by the preceding vehicle recognizer;
   a lane maintaining controller that, when a vehicle speed of the own-vehicle is greater than or equal to a predetermined vehicle speed, controls the own-vehicle so that the own-vehicle maintains a traffic lane along the lane mark recognized by the lane mark recognizer; and
   a prediction unit that predicts a shift of the vehicle speed of the own-vehicle to a running state with the predetermined vehicle speed or greater,
   wherein while the own-vehicle is under control of the path following controller, when (i) the preceding vehicle fades-out from an object recognized by the preceding vehicle recognizer, (ii) the vehicle speed is less than the predetermined vehicle speed, and (iii) the prediction unit predicts the shift of the own-vehicle to the running state with the predetermined vehicle speed or greater, the lane maintaining controller performs control of the own-vehicle.

2. The driving support device according to claim 1, further comprising
   a preceding vehicle following controller that, when the own-vehicle is controlled by the path following controller, performs acceleration and deceleration control of the own-vehicle to maintain a distance between the own-vehicle and the preceding vehicle with the vehicle speed of the own-vehicle less than or equal to a maximum target vehicle speed,
   wherein the prediction unit compares the maximum target vehicle speed with the predetermined vehicle speed, and when the maximum target vehicle speed is greater than or equal to the predetermined vehicle speed, the prediction unit predicts the shift of the own-vehicle to the running state with the predetermined vehicle speed or greater.

3. The driving support device according to claim 2,
   wherein the prediction unit continues to compare the maximum target vehicle speed with the predetermined vehicle speed until a predetermined allowable time elapses after the preceding vehicle fades-out from the object recognized by the preceding vehicle recognizer.

4. The driving support device according to claim 3, wherein the lane maintaining controller has control of the own-vehicle until the predetermined allowable time elapses.

5. The driving support device according to claim 1, wherein when the own-vehicle is located on a highway, the prediction unit predicts the shift of the own-vehicle to the running state with the predetermined vehicle speed or greater.

6. The driving support device according to claim 1, wherein the path following controller has the control of the own-vehicle when the vehicle speed of the own-vehicle is less than the predetermined vehicle speed and the preceding vehicle is being recognized by the preceding vehicle recognizer, and wherein while the own-vehicle is under control of the path following controller, when (i) the preceding vehicle fades-out from an object recognized by the preceding vehicle recognizer, (ii) the vehicle speed is less than the predetermined vehicle speed, and (iii) the prediction unit predicts the shift of the own-vehicle to the running state with the predetermined vehicle speed or greater, the lane maintaining controller has control of the own-vehicle even though the vehicle speed of the own-vehicle is less than the predetermined vehicle speed.

7. The driving support device according to claim 1, wherein the path following controller has the control of the own-vehicle when the vehicle speed of the own-vehicle is less than the predetermined vehicle speed and the preceding vehicle is being recognized by the preceding vehicle recognizer, and wherein while the own-vehicle is under control of the path following controller, when the preceding vehicle fades-out from an object recognized by the preceding vehicle recognizer, the control by the path following controller is canceled.

8. The driving support device according to claim 1, wherein the lane maintaining controller controls a steering of the own-vehicle such that the own-vehicle maintains the traffic lane along the lane mark recognized by the lane mark recognizer, and the path following controller controls the steering of the own-vehicle such that the own-vehicle follows the path of the preceding vehicle recognized by the preceding vehicle recognizer.

9. The driving support device according to claim 2, wherein the maximum target vehicle speed is variably set.

10. The driving support device according to claim 2, wherein the maximum target vehicle speed provides upper limit to the vehicle speed of the own-vehicle during the control by the preceding vehicle following controller.

11. A vehicle comprising the driving support device according to claim 2.

12. A driving support device comprising:
a preceding vehicle recognizing controller configured to recognize a preceding vehicle;
a lane mark recognizing controller configured to recognize a lane mark of a traffic lane in which an own-vehicle runs;
a path following controller configured to control the own-vehicle so that the own-vehicle follows a path of the preceding vehicle recognized by the preceding vehicle recognizing controller;
a lane maintaining controller configured to, when a vehicle speed of the own-vehicle is greater than or equal to a predetermined vehicle speed, control the own-vehicle so that the own-vehicle maintains a traffic lane along the lane mark recognized by the lane mark recognizing controller; and
a prediction controller configured to predict a shift of the vehicle speed of the own-vehicle to a running state with the predetermined vehicle speed or greater, wherein while the own-vehicle is under control of the path following controller, when (i) the preceding vehicle fades-out from an object recognized by the preceding vehicle recognizing controller, (ii) the vehicle speed is less than the predetermined vehicle speed, and (iii) the prediction controller predicts the shift of the own-vehicle to the running state with the predetermined vehicle speed or greater, the lane maintaining controller performs control of the own-vehicle even though the vehicle speed of the own-vehicle is less than the predetermined vehicle speed.

* * * * *